United States Patent
Uesaka et al.

(10) Patent No.: US 11,946,123 B2
(45) Date of Patent: *Apr. 2, 2024

(54) METHOD OF PRODUCING A NON-ORIENTED ELECTRICAL STEEL SHEET

(71) Applicant: JFE STEEL CORPORATION, Tokyo (JP)

(72) Inventors: Masanori Uesaka, Tokyo (JP); Yoshiaki Zaizen, Tokyo (JP); Tomoyuki Okubo, Tokyo (JP); Hiroaki Nakajima, Tokyo (JP); Yoshihiko Oda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/296,997

(22) Filed: Apr. 7, 2023

(65) Prior Publication Data

US 2023/0257860 A1     Aug. 17, 2023

Related U.S. Application Data

(62) Division of application No. 17/055,601, filed as application No. PCT/JP2019/019841 on May 20, 2019, now Pat. No. 11,649,532.

(30) Foreign Application Priority Data

May 21, 2018  (JP) ................................ 2018-097390

(51) Int. Cl.
  *C22C 38/10* (2006.01)
  *C21D 8/12* (2006.01)
  (Continued)

(52) U.S. Cl.
  CPC .......... *C22C 38/105* (2013.01); *C21D 8/1222* (2013.01); *C21D 8/1233* (2013.01);
  (Continued)

(58) Field of Classification Search
  None
  See application file for complete search history.

(56) References Cited

U.S. PATENT DOCUMENTS 10,093,998 B2   10/2018  Nagao et al.
10,102,951 B2   10/2018  Oda et al.
(Continued)

FOREIGN PATENT DOCUMENTS

CN     1556869 A    12/2004
CN   103882296 A     6/2014
(Continued)

OTHER PUBLICATIONS

Apr. 21, 2022, Office Action issued by the China National Intellectual Property Administration in the corresponding Chinese Patent Application No. 201980033850.2 with English language concise statement of relevance.
(Continued)

*Primary Examiner* — Anthony M Liang
(74) *Attorney, Agent, or Firm* — KENJA IP LAW PC

(57) ABSTRACT

Provided is a method of easily producing a non-oriented electrical steel sheet that contains substantially no Al and contains large amounts of Si and Mn and has low iron loss, comprising hot rolling a slab having a specified chemical composition to obtain a hot-rolled sheet; coiling the hot-rolled sheet; cold rolling the hot-rolled sheet once or twice with intermediate annealing being performed therebetween, to obtain a cold-rolled sheet; and subjecting the cold-rolled sheet to final annealing, wherein the hot-rolled sheet after the hot rolling is cooled at an average cooling rate from 800°
(Continued)

C. to 650° C. of 30° C./s or more, and thereafter the coiling is performed at 650° C. or less.

4 Claims, 2 Drawing Sheets

(51) Int. Cl.
    *C21D 9/46*     (2006.01)
    *C21D 9/68*     (2006.01)
    *C22C 38/00*     (2006.01)
    *C22C 38/02*     (2006.01)
    *C22C 38/04*     (2006.01)
    *C22C 38/06*     (2006.01)
    *C22C 38/08*     (2006.01)

(52) U.S. Cl.
    CPC .......... *C21D 8/1261* (2013.01); *C21D 8/1272* (2013.01); *C21D 9/46* (2013.01); *C21D 9/68* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01)

(56) References Cited

U.S. PATENT DOCUMENTS

| | | | |
|---|---|---|---|
| 11,142,813 B2 * | 10/2021 | Nakajima | ............ C22C 38/005 |
| 2006/0124207 A1 | 6/2006 | Takashima et al. | |
| 2016/0042850 A1 | 2/2016 | Oda et al. | |
| 2016/0351308 A1 | 12/2016 | Oda et al. | |
| 2017/0211161 A1 | 7/2017 | Nakanishi et al. | |
| 2018/0202021 A1 | 7/2018 | Oda et al. | |
| 2018/0327883 A1 | 11/2018 | Zaizen et al. | |
| 2019/0024205 A9 | 1/2019 | Oda et al. | |
| 2019/0228891 A1 | 7/2019 | Natori et al. | |
| 2019/0244735 A1 | 8/2019 | Oda et al. | |
| 2020/0190639 A1 | 6/2020 | Nakajima et al. | |

FOREIGN PATENT DOCUMENTS

| | | |
|---|---|---|
| CN | 105102656 A | 11/2015 |
| CN | 105189799 A | 12/2015 |
| CN | 107923019 A | 4/2018 |
| EP | 3176279 A1 | 6/2017 |
| JP | S64225 A | 1/1989 |
| JP | S64228 A | 1/1989 |
| JP | H0686624 B2 | 11/1994 |
| JP | 2002356752 A | 12/2002 |
| JP | 3490048 B2 | 1/2004 |
| JP | 2004292829 A | 10/2004 |
| JP | 4218136 B2 | 2/2009 |
| TW | 201610181 A | 3/2016 |
| TW | 201621061 A | 6/2016 |
| WO | 2014142100 A1 | 9/2014 |
| WO | 2015107967 A1 | 7/2015 |
| WO | 2017056383 A1 | 4/2017 |
| WO | 2017086036 A1 | 5/2017 |
| WO | 2018025941 A1 | 2/2018 |
| WO | 2018079059 A1 | 5/2018 |
| WO | 2018097006 A1 | 5/2018 |

OTHER PUBLICATIONS

Aug. 6, 2019, International Search Report issued in the International Patent Application No. PCT/JP2019/019841.
Dec. 30, 2021, Office Action issued by the China National Intellectual Property Administration in the corresponding Chinese Patent Application No. 201980033850.2 with English language concise statement of relevance.
Jan. 20, 2020, Office Action issued by the Taiwan Intellectual Property Office in the corresponding Taiwanese Patent Application No. 108117354 with English language Search Report.
Jan. 21, 2021, the Extended European Search Report issued by the European Patent Office in the corresponding European Patent Application No. 19808416.2.
Jun. 1, 2021, Office Action issued by the China National Intellectual Property Administration in the corresponding Chinese Patent Application No. 201980033850.2 with English language search report.
Jun. 20, 2020, Office Action issued by the Taiwan Intellectual Property Office in the corresponding Taiwanese Patent Application No. 108117354 with English language Concise Statement of Relevance.
Mar. 11, 2021, Office Action issued by the Taiwan Intellectual Property Office in the corresponding Taiwanese Patent Application No. 108117354 with English language search report.
Sep. 3, 2021, Office Action issued by the China National Intellectual Property Administration in the corresponding Chinese Patent Application No. 201980033850.2 with English language search report.
Wang Tingpu et al., Modern Steel Rolling, 2014, p. 240, Metallurgical Industry Press.

* cited by examiner

METHOD OF PRODUCING A NON-ORIENTED ELECTRICAL STEEL SHEET

CROSS-REFERENCE TO RELATED APPLICATIONS

The present application is a divisional application of U.S. patent application Ser. No. 17/055,601 filed Nov. 16, 2020, which is a National Stage Application of PCT/JP2019/019841 filed May 20, 2019, which claims priority of Japanese Patent Application No. 2018-097390 filed May 21, 2018. The disclosures of the prior applications are hereby incorporated by reference herein in their entirety.

TECHNICAL FIELD

The present disclosure relates to a non-oriented electrical steel sheet and a method of producing the same.

BACKGROUND

Non-oriented electrical steel sheets are a type of soft magnetic material widely used as iron core material of motors and the like. In recent trends of worldwide electricity saving and global environment protection, more efficient electrical devices are strongly needed. There is thus an increasing demand for improved magnetic properties of non-oriented electrical steel sheets widely used as iron core material of rotary machines, small or medium type transformers, and the like. This tendency is particularly noticeable in motors for electric cars or compressors, where improvement in efficiency of rotary machines is progressed. To meet the demand, measures such as addition of alloying elements such as Si and Al, sheet thickness reduction, surface state control, and control of precipitates for grain growth improvement are conventionally taken in order to reduce iron loss.

For example, JP 3490048 B2 (PTL 1) discloses a technique of adding 1.0% or more Si and 0.7% or more Al and controlling the roughness of the steel sheet surface after cold rolling and the partial pressure ratio of hydrogen and water vapor in the atmosphere of final annealing, to reduce the Al oxide layer in the steel sheet surface layer and reduce iron loss.

There are recent moves to dissolve used motor cores and reuse them in motor frames and the like as castings, for recycling of motors. Since the electrical steel sheet disclosed in PTL 1 contains Al, there is a problem in that, when the electrical steel sheet is reused, molten steel viscosity during casting increases and shrinkage cavities form. Thus, in the case of recycling a motor core as pig iron for castings, it is desirable that substantially no Al is contained.

As a method of producing a non-oriented electrical steel sheet that contains substantially no Al and has excellent iron loss property, JP 4218136 B2 (PTL 2) discloses the following technique: 0.01% to 1% Si and 1.5% or less Mn are added and the amount of dissolved oxygen in pre-deoxidation is appropriately adjusted to make $SiO_2$—MnO—$Al_2O_3$ inclusions nonductile and improve grain growth in final annealing. The addition amounts of Si and Mn according to this technique are relatively small. Hence, further reduction of iron loss by increasing the addition amount of Si and/or Mn is desired.

CITATION LIST

Patent Literatures

PTL 1: JP 3490048 B2
PTL 2: JP 4218136 B2

SUMMARY

Technical Problem

It could therefore be helpful to provide a non-oriented electrical steel sheet that contains substantially no Al and contains large amounts of Si and Mn and has low iron loss, and a method of easily producing the non-oriented electrical steel sheet.

Solution to Problem

As a result of close examination, we discovered that, for steel that contains no Al and contains large amounts of Si and Mn, grain growth in final annealing can be improved and iron loss can be reduced by lowering the coiling temperature after hot rolling to suppress precipitation of Si—Mn nitrides.

First, experiments that led to development of the presently disclosed techniques will be described below.

<Experiment 1>

To develop a non-oriented electrical steel sheet having excellent iron loss property, we looked at the iron loss reduction effect by an increase in Mn content again, and studied the influence of Mn on the iron loss. In the following description, "%" with regard to chemical compositions denotes "mass %" unless otherwise specified.

As sample materials, various steel ingots were each prepared by adding, to a steel composition containing C: 0.002%, Si: 2.0%, P: 0.01%, S: 0.002%, Al: 0.001%, N: 0.0015%, B: 0.0005%, and V: 0.0010% as a base composition, Mn in an amount varied in a range of 0.5% to 3.0%. These sample materials were each hot rolled to obtain a hot-rolled sheet with a sheet thickness of 2.0 mm. After the hot rolling, the hot-rolled sheet was cooled at an average cooling rate from 800° C. to 650° C. of 35° C./s. Following this, the hot-rolled sheet was subjected to coiling treatment at a temperature of 650° C., and then subjected to hot-rolled sheet annealing at 1000° C. for 10 sec. The average cooling rate from 800° C. to 650° C. after the hot-rolled sheet annealing was 35° C./s. The hot-rolled sheet was then cold rolled to obtain a cold-rolled sheet with a sheet thickness of 0.25 mm. Lastly, the cold-rolled sheet was subjected to final annealing at 1000° C. for 10 sec, in a 20 vol % $H_2$-80 vol % $N_2$ atmosphere. The iron loss $W_{15/50}$ of the resultant steel sheet was measured by a 25 cm Epstein device.

FIG. 1 illustrates the relationship between the Mn content in the steel sheet and the iron loss $W_{15/50}$. As illustrated in FIG. 1, when the Mn content was less than 1.0%, the iron loss decreased as the Mn content increased, as conventionally known. When the Mn content was 1.0% or more, however, the rate of decrease in iron loss with an increase in Mn content was not equal to but lower than the rate of decrease in iron loss (indicated by the chain line in the drawing) when the Mn content was less than 1.0%, and the iron loss hardly decreased. To investigate the cause of this, the cross-sectional microstructure of the steel sheet after the final annealing was observed with an optical microscope. The results revealed that each steel sheet having a Mn content of 1.0% or more had small grain size. Moreover, the precipitates in the steel sheet were observed with a transmission electron microscope (TEM) using an extraction replica method. The results revealed that each steel sheet having a Mn content of 1.0% or more had many fine Si—Mn nitrides.

In the present disclosure, the term "Si—Mn nitrides" refers to precipitates in which the sum of the ratios of Si and Mn is 10% or more and the ratio of N is 5% or more, in atomic ratio determined by energy dispersive X-ray spectrometry (EDS). In each steel sheet having a Mn content of 1.0% or more, the number of fine Si—Mn nitrides (as defined above) with an average diameter of 50 nm to 500 nm, which significantly influence domain wall displacement, was determined.

FIG. 2 illustrates the relationship between the Mn content and the number density of Si—Mn nitrides with an average diameter of 50 nm to 500 nm, regarding the precipitate observation results. As illustrated in FIG. 2, when the Mn content was 1.0% or more, the number density of Si—Mn nitrides was more than 1 per $\mu m^3$. Hence, the reason that the iron loss increased is presumed to be because the increase of the number density of Si—Mn nitrides caused a decrease in grain growth, as a result of which hysteresis loss increased.

<Experiment 2>

For high Mn steel having a Mn content of 1.0% or more, we studied the influence of the coiling temperature of the hot-rolled sheet on the iron loss. In detail, a steel ingot containing C: 0.002%, Si: 2.0%, Mn: 2.0%, P: 0.02%, S: 0.002%, Al: 0.001%, N: 0.0015%, and Nb: 0.0005% was prepared as a sample material. The sample material was hot rolled to obtain a hot-rolled sheet with a sheet thickness of 2.0 mm. After the hot rolling, the hot-rolled sheet was cooled at an average cooling rate from 800° C. to 650° C. of 35° C./s. Following this, the hot-rolled sheet was subjected to coiling treatment at a temperature of 500° C. to 700° C., and then subjected to hot-rolled sheet annealing at 1000° C. for 10 sec. The average cooling rate from 800° C. to 650° C. after the hot-rolled sheet annealing was 35° C./s. The hot-rolled sheet was then cold rolled to obtain a cold-rolled sheet with a sheet thickness of 0.25 mm. Lastly, the cold-rolled sheet was subjected to final annealing at 1000° C. for 10 sec, in a 20 vol % $H_2$-80 vol % $N_2$ atmosphere. The iron loss $W_{15/50}$ of the resultant steel sheet was measured by a 25 cm Epstein device.

FIG. 3 illustrates the relationship between the coiling temperature of the hot-rolled sheet and the iron loss $W_{15/50}$. As illustrated in FIG. 3, the iron loss decreased when the coiling temperature was 650° C. or less. To investigate the cause of this, the cross-sectional microstructure of the steel sheet after the final annealing was observed with an optical microscope. The results revealed that, when the coiling treatment temperature was 650° C. or less, the grain size of the steel sheet after the final annealing increased, and consequently the iron loss decreased.

Next, the precipitates in the final-annealed sheet were observed with a TEM using an extraction replica method. FIG. 4 illustrates the relationship between the coiling temperature of the hot-rolled sheet and the number density of Si—Mn nitrides with an average diameter of 50 nm to 500 nm. As illustrated in FIG. 4, when the coiling temperature was 650° C. or less, the number density of Si—Mn nitrides decreased to 1 or less per $\mu m^3$.

As described above, when the coiling temperature was 650° C. or less, the precipitation of Si—Mn nitrides during the coiling treatment was suppressed even in the case where the Mn content was 1.0% or more, so that the grain growth in the final annealing was improved. The reason why the precipitation of Si—Mn nitrides was suppressed when the coiling temperature was 650° C. or less is not clear, but is presumed to be because, as a result of lowering the coiling temperature, the diffusion of Si and Mn became insufficient and consequently the precipitation of Si—Mn nitrides was suppressed.

These results demonstrate that, by appropriately setting the coiling temperature after the hot rolling for steel that contains substantially no Al and contains large amounts of Si and Mn, the precipitation of Si—Mn nitrides is suppressed and the iron loss is reduced.

The present disclosure is based on these new discoveries. We thus provide:

1. A non-oriented electrical steel sheet, comprising a chemical composition containing (consisting of), in mass %, C: 0.0050% or less, Si: 2.0% or more and 6.0% or less, Mn: 1.0% or more and 3.0% or less, P: 0.20% or less, S: 0.0050% or less, N: 0.0050% or less, Al: 0.0050% or less, and one or more selected from the group consisting of B: 0.0001% or more and 0.0050% or less, Nb: 0.0001% or more and 0.0050% or less, and V: 0.0005% or more and 0.0500% or less, with a balance consisting of Fe and inevitable impurities, wherein a number density of Si—Mn nitrides with an average diameter of 50 nm or more and 500 nm or less is 1 or less per $\mu m^3$.

2. The non-oriented electrical steel sheet according to 1., wherein the chemical composition further contains, in mass %, one or two selected from the group consisting of Sn: 0.01% or more and 0.50% or less and Sb: 0.01% or more and 0.50% or less.

3. The non-oriented electrical steel sheet according to 1. or 2., wherein the chemical composition further contains, in mass %, one or more selected from the group consisting of Ca: 0.0001% or more and 0.0300% or less, Mg: 0.0001% or more and 0.0300% or less, and REM: 0.0001% or more and 0.0300% or less.

4. The non-oriented electrical steel sheet according to any one of 1. to 3., wherein the chemical composition further contains, in mass %, one or two selected from the group consisting of Ni: 0.01% or more and 5.00% or less and Co: 0.01% or more and 5.00% or less.

5. A method of producing a non-oriented electrical steel sheet, the method comprising: hot rolling a slab having the chemical composition according to any one of 1. to 4. to obtain a hot-rolled sheet; coiling the hot-rolled sheet; cold rolling the hot-rolled sheet once or twice with intermediate annealing being performed therebetween, to obtain a cold-rolled sheet; and subjecting the cold-rolled sheet to final annealing, wherein the hot-rolled sheet after the hot rolling is cooled at an average cooling rate from 800° C. to 650° C. of 30° C./s or more, and thereafter the coiling is performed at 650° C. or less.

6. A method of producing a non-oriented electrical steel sheet, the method comprising: hot rolling a slab having the chemical composition according to any one of 1. to 4. to obtain a hot-rolled sheet; coiling the hot-rolled sheet; subjecting the hot-rolled sheet to hot-rolled sheet annealing; thereafter cold rolling the hot-rolled sheet once or twice with intermediate annealing being performed therebetween, to obtain a cold-rolled sheet; and subjecting the cold-rolled sheet to final annealing, wherein the hot-rolled sheet after the hot rolling is cooled at an average cooling rate from 800° C. to 650° C. of 30° C./s or more, and thereafter the coiling is performed at 650° C. or less, and the hot-rolled sheet after the hot-rolled sheet annealing is cooled at an average cooling rate from 800° C. to 650° C. of 30° C./s or more.

Advantageous Effect

It is thus possible to provide a non-oriented electrical steel sheet that achieves low iron loss by containing large amounts of Si and Mn, while containing substantially no Al.

DETAILED DESCRIPTION

Figure 1:
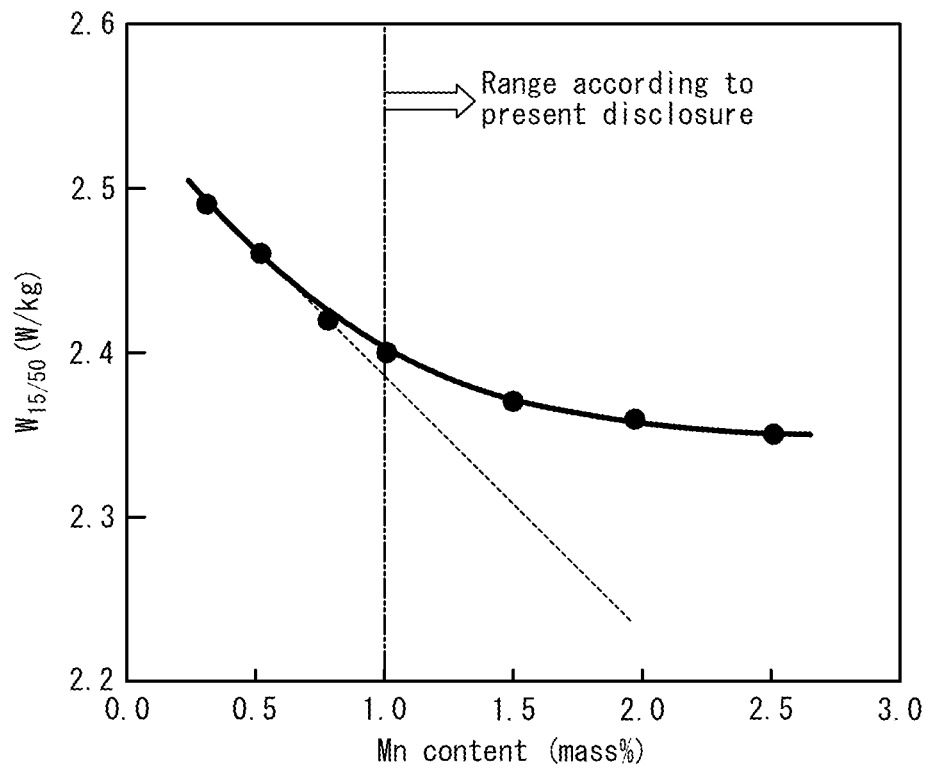
FIG. 1 is a graph illustrating the relationship between the Mn content and the iron loss $W_{15/50}$.
Figure 2:
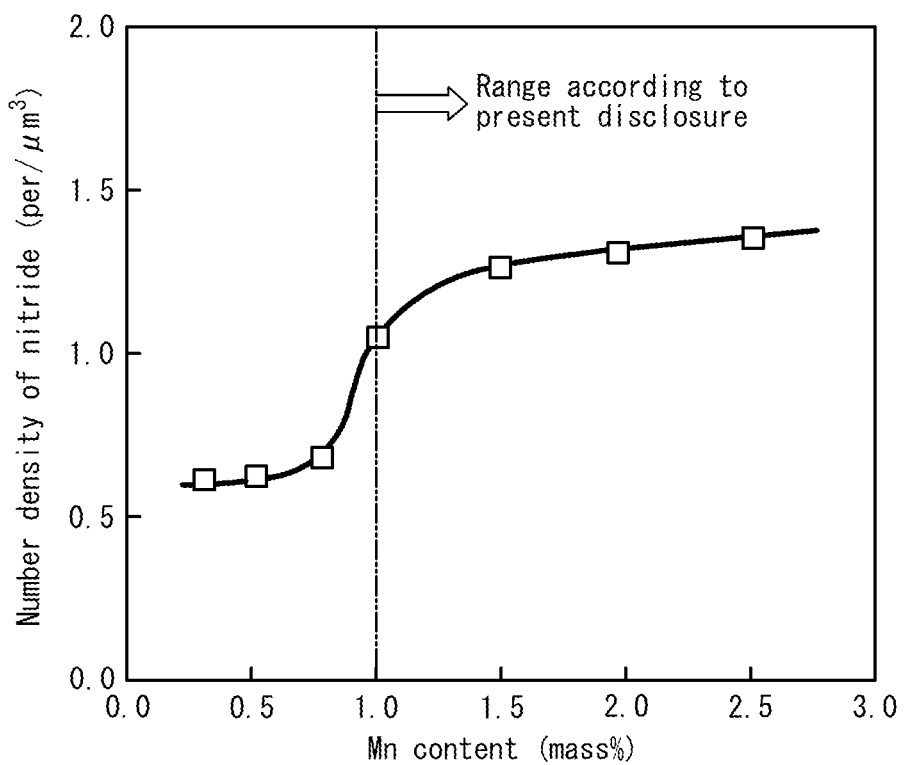
FIG. 2 is a graph illustrating the relationship between the Mn content and the number density of Si—Mn nitrides with an average diameter of 50 nm or more and 500 nm or less.
Figure 3:
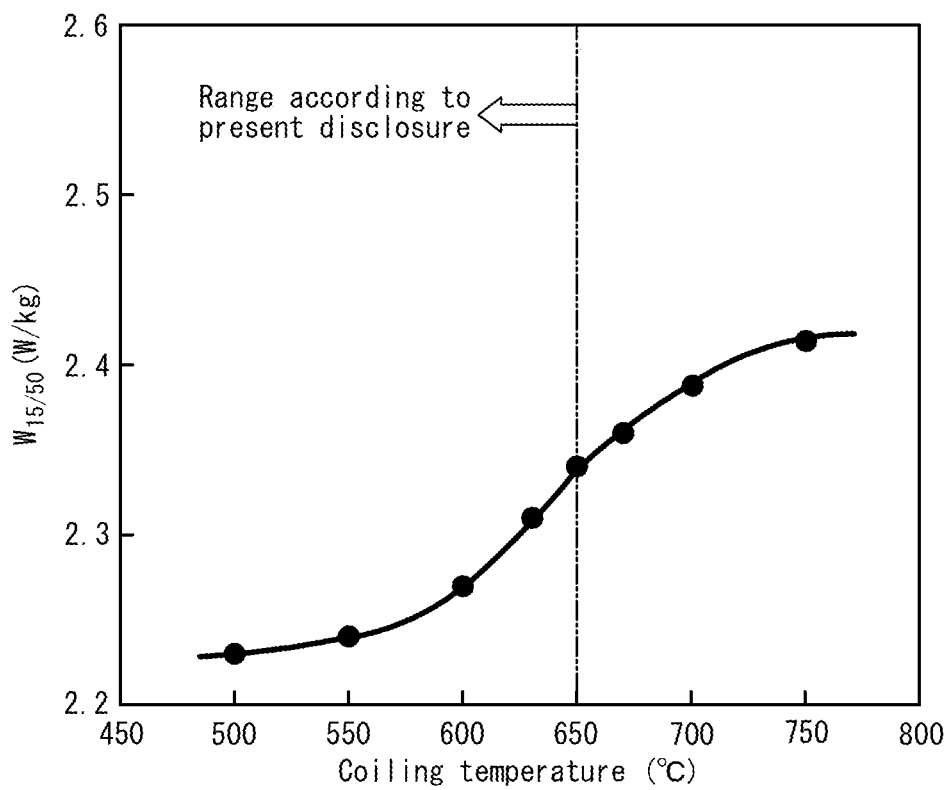
FIG. 3 is a graph illustrating the relationship between the coiling temperature of a hot-rolled sheet and the iron loss $W_{15/50}$.
Figure 4:
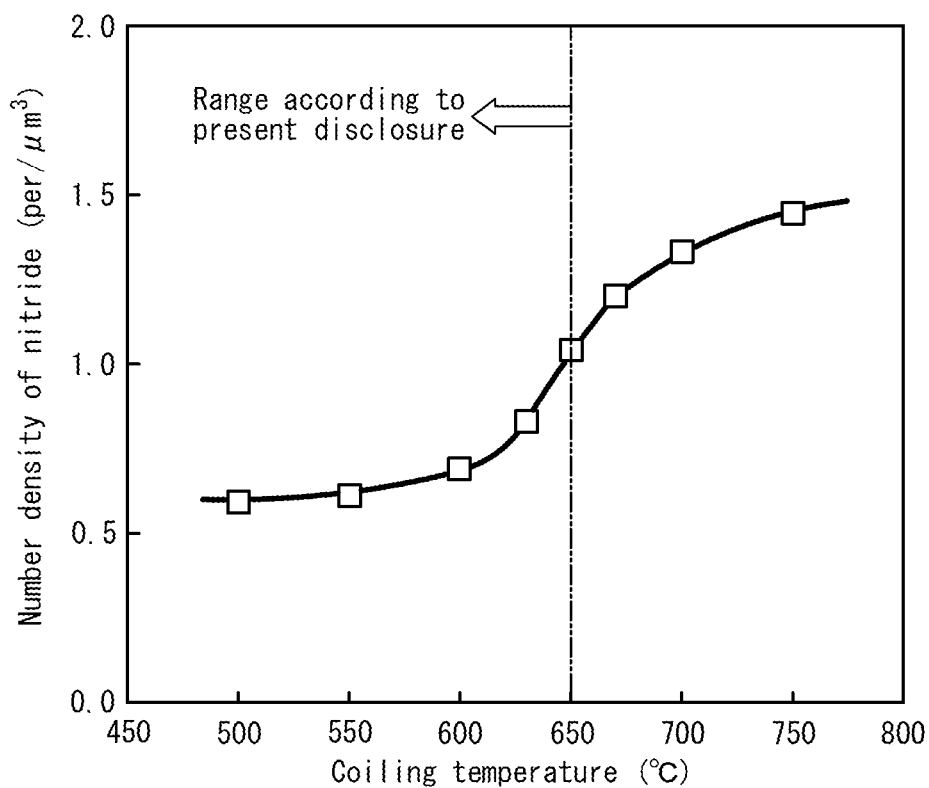
FIG. 4 is a graph illustrating the relationship between the coiling temperature of a hot-rolled sheet and the number density of Si—Mn nitrides with an average diameter of 50 nm or more and 500 nm or less.

A chemical composition of a non-oriented electrical steel sheet according to the present disclosure will be described below.

C: 0.0050% or Less

C causes magnetic aging in the product sheet, and therefore the C content is limited to 0.0050% or less. The C content is preferably 0.0040% or less. Limiting the C content to less than 0.0005% requires a considerable production cost. Accordingly, the C content is preferably 0.0005% or more in terms of cost.

Si: 2.0% or More and 6.0% or Less

Si is an element effective in enhancing the specific resistance of the steel and reducing iron loss. Si is therefore intentionally added in an amount of 2.0% or more. Excessively adding Si, however, causes significant embrittlement and hampers cold rolling. The upper limit is therefore 6.0%. The Si content is preferably 2.5% or more and 4.0% or less.

Mn: 1.0% or More and 3.0% or Less

Mn is an element effective in enhancing the specific resistance of the steel and reducing iron loss. Mn is therefore intentionally added in an amount of 1.0% or more. If the Mn content is more than 3.0%, however, cold rolling manufacturability decreases or magnetic flux density decreases. The upper limit is therefore 3.0%. The Mn content is preferably 1.0% or more and 2.0% or less. The Mn content is more preferably 1.2% or more, and further preferably 1.4% or more.

P: 0.20% or Less

P is an element that is excellent in solid solution strengthening and thus is effective in hardness adjustment and blanking workability improvement. If the P content is more than 0.20%, embrittlement is noticeable. The upper limit is therefore 0.20%. The P content is preferably 0.050% or less. Limiting the P content to less than 0.0005% requires a considerable production cost. Accordingly, the P content is preferably 0.0005% or more in terms of cost.

S: 0.0050% or Less

S is a harmful element that forms sulfides and increases iron loss. The upper limit is therefore 0.0050%. The S content is preferably 0.0040% or less. Limiting the S content to less than 0.0001% requires a considerable production cost. Accordingly, the S content is preferably 0.0001% or more in terms of cost.

N: 0.0050% or Less

N is a harmful element that forms Si—Mn nitrides and increases iron loss, as mentioned above. The upper limit is therefore 0.0050%. The N content is preferably 0.0030% or less, and more preferably 0.0015% or less. Limiting the N content to less than 0.0001% requires a considerable production cost. Accordingly, the N content is preferably 0.0001% or more in terms of cost.

Al: 0.0050% or Less

It is desirable to add substantially no Al, in terms of recycling. If Al is present in a minute amount, Al forms fine AlN and hinders grain growth, thus impairing the magnetic properties. The upper limit is therefore 0.0050%. The Al content is preferably 0.0030% or less. The expression "contain (or add) substantially no Al" means that Al is present in a range that allows inevitable mixing, including the case where the Al content is 0%.

Sn, Sb: 0.01% or More and 0.50% or Less

Sn and Sb are elements that improve texture and thus are effective in magnetic flux density improvement. Each of these elements is not effective unless its content is 0.01% or more. If the content is more than 0.50%, the effect is saturated. Accordingly, the Sn content and the Sb content are each 0.01% or more and 0.50% or less. The Sn content and the Sb content are each preferably 0.03% or more and 0.50% or less.

Ca, Mg, REM: 0.0001% or More and 0.0300% or Less

Ca, Mg, and REM are elements that fix S and suppress precipitation of fine sulfides and thus are effective in iron loss reduction. Each of these elements is not effective unless its content is 0.0001% or more. If the content is more than 0.0300%, the effect is saturated. Accordingly, the Ca content, the Mg content, and the REM content are each 0.0001% or more and 0.0300% or less. The Ca content, the Mg content, and the REM content are each preferably 0.0020% or more and 0.0300% or less.

Ni, Co: 0.01% or More and 5.00% or Less

Ni and Co are elements effective in enhancing the specific resistance of the steel and reducing iron loss. Each of these elements is not effective unless its content is 0.01% or more. If the content is more than 5.00%, the alloy cost increases. Accordingly, the Ni content and the Co content are each 0.01% or more and 5.00% or less. The Ni content and the Co content are each preferably 0.05% or more and 5.00% or less.

One or More Selected from the Group Consisting of B, Nb: 0.0001% or More and 0.0050% or Less and V: 0.0005% or More and 0.0500% or Less B, Nb, and V are elements that fix N and suppress precipitation of fine Si—Mn nitrides and thus are effective in iron loss reduction. To achieve the effect, the B content and the Nb content are each 0.0001% or more, and the V content is 0.0005% or more. If the B content or the Nb content is more than 0.0050% or if the V content is more than 0.0500%, the element does not dissolve during heating in final annealing, and hinders grain growth. Accordingly, the B content and the Nb content are each 0.0001% or more and 0.0050% or less, and the V content is 0.0005% or more and 0.0500% or less. Preferably, the B content and the Nb content are each 0.0010% or more and 0.0040% or less, and the V content is 0.0010% or more and 0.0200% or less.

The balance other than the foregoing components in the non-oriented electrical steel sheet according to the present disclosure consists of Fe and inevitable impurities. The non-oriented electrical steel sheet according to the present disclosure may contain other components in a range that does not hinder the effects according to the present disclosure.

In the present disclosure, it is important to limit the number density of Si—Mn nitrides with an average diameter of 50 nm or more and 500 nm or less in the steel sheet, which is a size significantly influencing domain wall displacement, to 1 or less per $\mu m^3$, as mentioned above. If the number density is more than 1 per $\mu m^3$, the iron loss of the final-annealed sheet is not reduced sufficiently. The number density is preferably 0.8 or less per $\mu m^3$, and more preferably 0.7 or less per $\mu m^3$. The number density may be 0 per $\mu m^3$.

Si—Mn nitrides are observed with a TEM using an extraction replica method, as mentioned above. The measurement is performed for observation fields in which the diameters and numbers of Si—Mn nitrides are balanced. Specifically, the observation is preferably performed for observation fields within a range of 1000 $\mu m^2$ at 10000 or more. Si—Mn nitrides of 50 nm or more and 500 nm or less in diameter, which significantly influence domain wall displacement, are observed. For each Si—Mn nitride not isotropic in shape, a value obtained by dividing the sum of the major axis length and the minor axis length of the Si—Mn nitride by 2 is taken to be the diameter of the Si—Mn nitride. The number density of Si—Mn nitrides is calculated on the assumption that the total electric charge conducted at the sample surface in an electrolysis step in a replica production process is consumed for electrolysis into divalent ions of Fe and all precipitates remaining as remnants in the electrolysis are captured on a replica. In our typical replica production, electrolysis is performed with an electric charge of 3 $C/cm^2$ in sample surface area, and accordingly precipitates within a thickness of about 1.1 $\mu m$ from the sample surface are observed on the replica.

A method of producing the non-oriented electrical steel sheet according to the present disclosure will be described below.

The non-oriented electrical steel sheet according to the present disclosure can be produced by a known non-oriented electrical steel sheet production method, as long as the steel material used in the production has the chemical composition described above and the cooling conditions after hot rolling and the coiling temperature are within the prescribed range. An example of a method that can be used involves obtaining, by steelmaking, steel adjusted to the predetermined chemical composition described above through a refining process using a converter, an electric heating furnace, and the like, subjecting the steel to secondary refining on a degassing line and the like, continuously casting the steel to form a steel slab, thereafter subjecting the steel slab to hot rolling and optionally to hot-rolled sheet annealing, thereafter subjecting the hot-rolled sheet to pickling, cold rolling, and final annealing, and further subjecting the cold-rolled sheet to stress relief annealing.

The thickness of the hot-rolled sheet obtained as a result of the hot rolling is preferably 1.0 mm to 5.0 mm. If the thickness of the hot-rolled sheet is less than 1.0 mm, rolling troubles in the hot rolling increase. If the thickness of the hot-rolled sheet is more than 5.0 mm, the cold rolling reduction ratio in the subsequent step is excessively high, which causes degradation of texture.

It is important that the average cooling rate from 800° C. to 650° C. in the cooling after the hot rolling is 30° C./s or more. If the average cooling rate is less than 30° C./s, many Si—Mn nitrides precipitate during the cooling after the hot rolling, causing an increase in iron loss. The average cooling rate from 800° C. to 650° C. is preferably 300° C./s or less, in terms of suppressing deformation due to cooling strain.

The average cooling rate after the hot rolling can be increased, for example, by a method of spraying a coolant of a water temperature of 30° C. or less onto the steel sheet on a run-out table after the hot rolling. To further increase the cooling rate, it is preferable that nozzles that differ in coolant spray direction are alternately arranged in the transverse direction of the hot-rolled sheet so as not to form a water film on the steel sheet.

The hot-rolled sheet on which the cooling has been performed is then coiled. The coiling temperature needs to be 650° C. or less. The coiling temperature is more preferably 600° C. or less, and further preferably 550° C. or less. This is because the precipitation of Si—Mn nitrides decreases with a decrease in coiling temperature, and the precipitation is hardly recognized when the coiling temperature is 550° C. or less. If the coiling temperature is less than 300° C., the amount of nitrides precipitated is unchanged, and the plant capacity is excessive. Accordingly, the coiling temperature is preferably 300° C. or more.

The hot-rolled sheet may be optionally subjected to hot-rolled sheet annealing. However, the effects according to the present disclosure are more prominent in the case where the hot-rolled sheet is not subjected to hot-rolled sheet annealing, because the hot-rolled sheet annealing facilitates precipitation of Si—Mn nitrides in a cooling process after the hot-rolled sheet annealing. In the case of performing the hot-rolled sheet annealing, the soaking temperature is preferably in a range of 900° C. to 1200° C. If the soaking temperature is less than 900° C., the effect of the hot-rolled sheet annealing is insufficient, and the magnetic properties cannot be improved. If the soaking temperature is more than 1200° C., not only there is a cost disadvantage, but also surface defects are caused by scale. After the hot-rolled sheet annealing, cooling is performed at a cooling rate from 800° C. to 650° C. of 30° C./s or more as mentioned above, in order to suppress precipitation of Si—Mn nitrides.

The cold rolling of the hot-rolled sheet or the hot-rolled and annealed sheet is preferably performed once, or twice or more with intermediate annealing being performed therebetween. In particular, it is preferable to perform, as the final cold rolling, warm rolling at a sheet temperature of about 200° C. unless it is not problematic in terms of facility, production constraints, or cost, because such warm rolling is effective in improving magnetic flux density.

The sheet thickness (final sheet thickness) of the cold-rolled sheet is preferably in a range of 0.1 mm to 0.5 mm. If the sheet thickness is less than 0.1 mm, productivity decreases. If the sheet thickness is more than 0.5 mm, the iron loss reduction effect is low.

In the final annealing performed on the cold-rolled sheet having the final sheet thickness, the cold-rolled sheet is soaked at a temperature of 700° C. to 1200° C. for 1 sec to 300 sec in a continuous annealing furnace. If the soaking temperature is less than 700° C., recrystallization is insufficient, and favorable magnetic properties cannot be achieved. In addition, the effect of adjusting the sheet shape in continuous annealing is insufficient. If the soaking temperature is more than 1200° C., crystal grains coarsen, and toughness decreases. If the soaking time is less than 1 sec, grain size control is difficult. If the soaking time is more than 300 sec, productivity decreases.

An insulating coating is preferably applied to the steel sheet surface of the steel sheet after the final annealing, in order to increase interlaminar resistance and reduce iron loss. In particular, to ensure favorable blanking workability, it is desirable to use a semiorganic insulating coating containing resin.

The non-oriented electrical steel sheet to which the insulating coating has been applied may or may not be subjected to stress relief annealing by the user, before use. The non-oriented electrical steel sheet may be subjected to the stress relief annealing after blanking by the user. The stress relief annealing is typically performed under the conditions of approximately 750° C. and 2 hr.

EXAMPLES

Example 1

In a refining process of converter and vacuum degassing treatment, steels of No. 1 to No. 73 having the chemical compositions listed in Table 1 were each obtained by steelmaking, and continuously cast into a slab. The slab was then heated at 1140° C. for 1 hr and hot rolled to a sheet thickness of 2.0 mm, and subjected to cooling and coiling treatment after the hot rolling under the conditions listed in Table 2. Following this, the hot-rolled sheet was subjected to hot-rolled sheet annealing at 1000° C. for 30 sec, and then pickled and cold rolled to a sheet thickness of 0.25 mm. The average cooling rate from 800° C. to 650° C. after the hot-rolled sheet annealing was 32° C./s. The cold-rolled sheet was then subjected to final annealing at 1000° C. for 10 sec in a 20 vol % $H_2$-80 vol % $N_2$ atmosphere, and an insulating coating was applied to the resultant steel sheet to obtain a non-oriented electrical steel sheet. Lastly, using Epstein test pieces of 30 mm×280 mm, the iron loss $W_{15/50}$ was evaluated with a 25 cm Epstein device, and further the number density of Si—Mn nitrides in the final-annealed sheet was measured with a TEM using an extraction replica method. The results are listed in Table 2. Here, the number density of Si—Mn nitrides was calculated from the number of Si—Mn nitrides present in observation for observation fields within a range of 1000 μm$^2$ at 10000.

As can be understood from Table 2, by controlling the chemical composition of the steel material and the coiling treatment conditions within the range according to the present disclosure, a non-oriented electrical steel sheet having excellent iron loss property can be easily obtained.

TABLE 1

| | (mass %) | | | | | |
|---|---|---|---|---|---|---|
| Condition No. | C | Si | Mn | P | S | N |
| 1 | 0.0016 | 2.51 | 1.51 | 0.011 | 0.0024 | 0.0011 |
| 2 | 0.0015 | 1.50 | 1.50 | 0.010 | 0.0020 | 0.0011 |
| 3 | 0.0015 | 2.01 | 1.50 | 0.010 | 0.0020 | 0.0011 |
| 4 | 0.0019 | 3.00 | 1.50 | 0.010 | 0.0020 | 0.0014 |
| 5 | 0.0017 | 4.03 | 1.53 | 0.010 | 0.0023 | 0.0014 |
| 6 | 0.0020 | 5.04 | 1.51 | 0.008 | 0.0023 | 0.0015 |
| 7 | 0.0018 | 6.50 | 1.06 | 0.008 | 0.0020 | 0.0014 |
| 8 | 0.0020 | 2.54 | 0.89 | 0.008 | 0.0030 | 0.0025 |
| 9 | 0.0020 | 2.55 | 1.06 | 0.008 | 0.0030 | 0.0015 |
| 10 | 0.0019 | 2.51 | 1.96 | 0.012 | 0.0022 | 0.0014 |
| 11 | 0.0018 | 2.51 | 2.93 | 0.011 | 0.0022 | 0.0015 |
| 12 | 0.0017 | 2.52 | 3.25 | 0.011 | 0.0021 | 0.0018 |
| 13 | 0.0015 | 2.50 | 1.05 | 0.011 | 0.0018 | 0.0017 |
| 14 | 0.0017 | 2.50 | 1.05 | 0.011 | 0.0017 | 0.0015 |
| 15 | 0.0016 | 2.50 | 1.05 | 0.011 | 0.0016 | 0.0016 |
| 16 | 0.0020 | 2.46 | 1.54 | 0.011 | 0.0025 | 0.0010 |
| 17 | 0.0015 | 2.53 | 1.50 | 0.012 | 0.0022 | 0.0014 |
| 18 | 0.0021 | 2.54 | 1.47 | 0.012 | 0.0028 | 0.0012 |
| 19 | 0.0008 | 2.46 | 1.51 | 0.011 | 0.0028 | 0.0013 |
| 20 | 0.0044 | 2.47 | 1.55 | 0.012 | 0.0022 | 0.0014 |
| 21 | 0.0060 | 2.48 | 1.56 | 0.012 | 0.0023 | 0.0015 |
| 22 | 0.0021 | 2.53 | 1.51 | 0.080 | 0.0024 | 0.0012 |
| 23 | 0.0019 | 2.52 | 1.50 | 0.162 | 0.0025 | 0.0011 |
| 24 | 0.0017 | 2.52 | 1.52 | 0.225 | 0.0021 | 0.0013 |
| 25 | 0.0020 | 2.52 | 1.48 | 0.009 | 0.0008 | 0.0006 |
| 26 | 0.0025 | 2.53 | 1.52 | 0.011 | 0.0045 | 0.0011 |
| 27 | 0.0021 | 2.54 | 1.50 | 0.011 | 0.0060 | 0.0013 |
| 28 | 0.0024 | 2.54 | 1.50 | 0.008 | 0.0030 | 0.0006 |
| 29 | 0.0015 | 2.51 | 1.53 | 0.012 | 0.0029 | 0.0047 |
| 30 | 0.0020 | 2.49 | 1.52 | 0.012 | 0.0022 | 0.0062 |
| 31 | 0.0016 | 2.50 | 1.53 | 0.012 | 0.0026 | 0.0011 |
| 32 | 0.0017 | 2.53 | 1.49 | 0.012 | 0.0020 | 0.0011 |
| 33 | 0.0015 | 2.50 | 1.46 | 0.008 | 0.0020 | 0.0011 |
| 34 | 0.0020 | 2.50 | 1.46 | 0.008 | 0.0021 | 0.0011 |
| 35 | 0.0016 | 2.46 | 1.49 | 0.011 | 0.0030 | 0.0014 |
| 36 | 0.0022 | 2.50 | 1.53 | 0.008 | 0.0028 | 0.0010 |
| 37 | 0.0021 | 2.49 | 1.50 | 0.011 | 0.0023 | 0.0015 |
| 38 | 0.0022 | 2.51 | 1.53 | 0.011 | 0.0026 | 0.0012 |
| 39 | 0.0022 | 2.51 | 1.53 | 0.011 | 0.0026 | 0.0012 |
| 40 | 0.0017 | 2.47 | 1.51 | 0.009 | 0.0027 | 0.0014 |
| 41 | 0.0021 | 2.46 | 1.50 | 0.011 | 0.0023 | 0.0014 |
| 42 | 0.0022 | 2.46 | 1.51 | 0.011 | 0.0030 | 0.0013 |
| 43 | 0.0024 | 2.47 | 1.50 | 0.012 | 0.0021 | 0.0011 |
| 44 | 0.0024 | 2.47 | 1.50 | 0.012 | 0.0021 | 0.0011 |
| 45 | 0.0016 | 2.49 | 1.54 | 0.012 | 0.0022 | 0.0014 |
| 46 | 0.0016 | 2.49 | 1.54 | 0.012 | 0.0022 | 0.0014 |

TABLE 1-continued

| | | | (mass %) | | | |
|---|---|---|---|---|---|---|
| 47 | 0.0016 | 2.51 | 1.45 | 0.008 | 0.0025 | 0.0011 |
| 48 | 0.0016 | 2.51 | 1.45 | 0.008 | 0.0025 | 0.0011 |
| 49 | 0.0020 | 2.47 | 1.46 | 0.010 | 0.0027 | 0.0011 |
| 50 | 0.0019 | 2.46 | 1.46 | 0.011 | 0.0020 | 0.0010 |
| 51 | 0.0022 | 2.46 | 1.45 | 0.011 | 0.0029 | 0.0010 |
| 52 | 0.0016 | 2.51 | 1.54 | 0.009 | 0.0022 | 0.0015 |
| 53 | 0.0019 | 2.46 | 1.46 | 0.100 | 0.2200 | 0.0010 |
| 54 | 0.0019 | 2.47 | 1.49 | 0.008 | 0.0022 | 0.0012 |
| 55 | 0.0017 | 2.47 | 1.51 | 0.008 | 0.0029 | 0.0012 |
| 56 | 0.0020 | 2.47 | 1.51 | 0.011 | 0.0029 | 0.0130 |
| 57 | 0.0022 | 2.47 | 1.53 | 0.012 | 0.0022 | 0.0010 |
| 58 | 0.0170 | 2.50 | 1.50 | 0.008 | 0.0021 | 0.0012 |
| 59 | 0.0019 | 2.50 | 1.50 | 0.008 | 0.0018 | 0.0014 |
| 60 | 0.0018 | 2.50 | 1.50 | 0.009 | 0.0017 | 0.0014 |
| 61 | 0.0015 | 2.51 | 1.52 | 0.010 | 0.0015 | 0.0013 |
| 62 | 0.0020 | 2.51 | 1.52 | 0.010 | 0.0020 | 0.0012 |
| 63 | 0.0022 | 2.51 | 1.50 | 0.010 | 0.0021 | 0.0011 |
| 64 | 0.0019 | 2.50 | 1.50 | 0.011 | 0.0021 | 0.0012 |
| 65 | 0.0022 | 2.51 | 1.50 | 0.010 | 0.0021 | 0.0011 |
| 66 | 0.0022 | 2.51 | 1.50 | 0.010 | 0.0021 | 0.0011 |
| 67 | 0.0018 | 2.50 | 1.50 | 0.011 | 0.0008 | 0.0011 |
| 68 | 0.0018 | 2.50 | 1.50 | 0.011 | 0.0019 | 0.0014 |
| 69 | 0.0018 | 2.51 | 1.50 | 0.012 | 0.0015 | 0.0014 |
| 70 | 0.0018 | 2.50 | 1.50 | 0.001 | 0.0016 | 0.0014 |
| 71 | 0.0018 | 2.50 | 1.50 | 0.001 | 0.0016 | 0.0014 |
| 72 | 0.0019 | 2.50 | 1.50 | 0.010 | 0.0018 | 0.0011 |
| 73 | 0.0020 | 2.51 | 1.50 | 0.010 | 0.0021 | 0.0010 |

| Condition No. | Al | Sn | Sb | Ca | Mg | REM |
|---|---|---|---|---|---|---|
| 1 | 0.0010 | tr. | tr. | tr. | tr. | tr. |
| 2 | 0.0010 | tr. | tr. | tr. | tr. | tr. |
| 3 | 0.0010 | tr. | tr. | tr. | tr. | tr. |
| 4 | 0.0010 | tr. | tr. | tr. | tr. | tr. |
| 5 | 0.0007 | tr. | tr. | tr. | tr. | tr. |
| 6 | 0.0008 | tr. | tr. | tr. | tr. | tr. |
| 7 | 0.0007 | tr. | tr. | tr. | tr. | tr. |
| 8 | 0.0008 | tr. | tr. | tr. | tr. | tr. |
| 9 | 0.0008 | tr. | tr. | tr. | tr. | tr. |
| 10 | 0.0001 | tr. | tr. | tr. | tr. | tr. |
| 11 | 0.0009 | tr. | tr. | tr. | tr. | tr. |
| 12 | 0.0009 | tr. | tr. | tr. | tr. | tr. |
| 13 | 0.0007 | tr. | tr. | tr. | tr. | tr. |
| 14 | 0.0007 | tr. | tr. | tr. | tr. | tr. |
| 15 | 0.0007 | tr. | tr. | tr. | tr. | tr. |
| 16 | 0.0007 | tr. | tr. | tr. | tr. | tr. |
| 17 | 0.0006 | tr. | tr. | tr. | tr. | tr. |
| 18 | 0.0008 | tr. | tr. | tr. | tr. | tr. |
| 19 | 0.0006 | tr. | tr. | tr. | tr. | tr. |
| 20 | 0.0009 | tr. | tr. | tr. | tr. | tr. |
| 21 | 0.0009 | tr. | tr. | tr. | tr. | tr. |
| 22 | 0.0008 | tr. | tr. | tr. | tr. | tr. |
| 23 | 0.0008 | tr. | tr. | tr. | tr. | tr. |
| 24 | 0.0007 | tr. | tr. | tr. | tr. | tr. |
| 25 | 0.0009 | tr. | tr. | tr. | tr. | tr. |
| 26 | 0.0009 | tr. | tr. | tr. | tr. | tr. |
| 27 | 0.0009 | tr. | tr. | tr. | tr. | tr. |
| 28 | 0.0008 | tr. | tr. | tr. | tr. | tr. |
| 29 | 0.0009 | tr. | tr. | tr. | tr. | tr. |
| 30 | 0.0009 | tr. | tr. | tr. | tr. | tr. |
| 31 | 0.0045 | tr. | tr. | tr. | tr. | tr. |
| 32 | 0.0072 | tr. | tr. | tr. | tr. | tr. |
| 33 | 0.0007 | 0.01 | tr. | tr. | tr. | tr. |
| 34 | 0.0007 | 0.03 | tr. | tr. | tr. | tr. |
| 35 | 0.0007 | 0.47 | tr. | tr. | tr. | tr. |
| 36 | 0.0010 | 0.61 | tr. | tr. | tr. | tr. |
| 37 | 0.0007 | tr. | 0.005 | tr. | tr. | tr. |
| 38 | 0.0007 | tr. | 0.04 | tr. | tr. | tr. |
| 39 | 0.0007 | tr. | 0.60 | tr. | tr. | tr. |
| 40 | 0.0009 | 0.03 | 0.03 | tr. | tr. | tr. |
| 41 | 0.0008 | tr. | tr. | 0.0010 | tr. | tr. |
| 42 | 0.0008 | tr. | tr. | 0.0031 | tr. | tr. |
| 43 | 0.0010 | tr. | tr. | 0.0121 | tr | tr. |
| 44 | 0.0010 | tr. | tr. | 0.0400 | tr. | tr. |
| 45 | 0.0008 | tr. | tr. | tr. | 0.0029 | tr. |
| 46 | 0.0008 | tr. | tr. | tr. | 0.0350 | tr. |
| 47 | 0.0007 | tr. | tr. | tr. | tr. | 0.0035 |
| 48 | 0.0007 | tr. | tr. | tr. | tr. | 0.0360 |

TABLE 1-continued

|  | (mass %) |  |  |  |  |  |
|---|---|---|---|---|---|---|
| 49 | 0.0007 | tr. | tr. | 0.0033 | 0.0028 | 0.0033 |
| 50 | 0.0007 | tr. | tr. | tr. | tr. | tr. |
| 51 | 0.0007 | tr. | tr. | tr. | tr. | tr. |
| 52 | 0.0007 | tr. | tr. | tr. | tr. | tr. |
| 53 | 0.0007 | tr. | tr. | tr. | tr. | tr. |
| 54 | 0.0008 | tr. | tr. | tr. | tr. | tr. |
| 55 | 0.0008 | tr. | tr. | tr. | tr. | tr. |
| 56 | 0.0008 | tr. | tr. | tr. | tr. | tr. |
| 57 | 0.0007 | tr. | tr. | tr. | tr. | tr. |
| 58 | 0.0009 | 0.03 | tr. | 0.0035 | tr. | tr. |
| 59 | 0.0009 | tr. | tr. | tr. | tr. | tr. |
| 60 | 0.0007 | tr. | tr. | tr. | tr. | tr. |
| 61 | 0.0001 | tr. | tr. | tr. | tr. | tr. |
| 62 | 0.0008 | tr. | tr. | tr. | tr. | tr. |
| 63 | 0.0008 | tr. | tr. | tr. | tr. | tr. |
| 64 | 0.0008 | tr. | tr. | tr. | tr. | tr. |
| 65 | 0.0008 | tr. | tr. | tr. | tr. | tr. |
| 66 | 0.0008 | tr. | tr. | tr. | tr. | tr. |
| 67 | 0.0009 | tr. | tr. | tr. | tr. | tr. |
| 68 | 0.0007 | tr. | tr. | tr. | tr. | tr. |
| 69 | 0.0008 | tr. | tr. | tr. | tr. | tr. |
| 70 | 0.0008 | tr. | tr. | tr. | tr. | tr. |
| 71 | 0.0008 | tr. | tr. | tr. | tr. | tr. |
| 72 | 0.0009 | tr. | tr. | tr. | tr. | tr. |
| 73 | 0.0009 | tr. | tr. | tr. | tr. | tr. |

| Condition No. | Ni | Co | B | Nb | V |
|---|---|---|---|---|---|
| 1 | tr. | tr. | 0.0001 | tr. | tr. |
| 2 | tr. | tr. | 0.0002 | tr. | tr. |
| 3 | tr. | tr. | 0.0002 | tr. | tr. |
| 4 | tr. | tr. | 0.0002 | tr. | tr. |
| 5 | tr. | tr. | 0.0001 | tr. | tr. |
| 6 | tr. | tr. | 0.0001 | tr. | tr. |
| 7 | tr. | tr. | 0.0001 | tr. | tr. |
| 8 | tr. | tr. | 0.0001 | tr. | tr. |
| 9 | tr. | tr. | 0.0001 | tr. | tr. |
| 10 | tr. | tr. | 0.0001 | tr. | tr. |
| 11 | tr. | tr. | 0.0002 | tr. | tr. |
| 12 | tr. | tr. | 0.0002 | tr. | tr. |
| 13 | tr. | tr. | 0.0002 | tr. | tr. |
| 14 | tr. | tr. | 0.0002 | tr. | tr. |
| 15 | tr. | tr. | 0.0001 | tr. | tr. |
| 16 | tr. | tr. | 0.0001 | tr. | tr. |
| 17 | tr. | tr. | 0.0001 | tr. | tr. |
| 18 | tr. | tr. | 0.0001 | tr. | tr. |
| 19 | tr. | tr. | 0.0002 | tr. | 0.0005 |
| 20 | tr. | tr. | 0.0002 | tr. | 0.0005 |
| 21 | tr. | tr. | 0.0002 | tr. | 0.0005 |
| 22 | tr. | tr. | 0.0002 | tr. | 0.0005 |
| 23 | tr. | tr. | 0.0002 | tr. | 0.0005 |
| 24 | tr. | tr. | 0.0002 | tr. | 0.0005 |
| 25 | tr. | tr. | 0.0002 | tr. | 0.0005 |
| 26 | tr. | tr. | 0.0002 | tr. | 0.0005 |
| 27 | tr. | tr. | 0.0002 | tr. | 0.0005 |
| 28 | tr. | tr. | 0.0002 | tr. | 0.0005 |
| 29 | tr. | tr. | 0.0001 | tr. | 0.0005 |
| 30 | tr. | tr. | 0.0001 | tr. | 0.0005 |
| 31 | tr. | tr. | 0.0001 | tr. | 0.0005 |
| 32 | tr. | tr. | 0.0001 | tr. | 0.0005 |
| 33 | tr. | tr. | 0.0001 | tr. | 0.0005 |
| 34 | tr. | tr. | 0.0001 | tr. | 0.0005 |
| 35 | tr. | tr. | 0.0001 | tr. | 0.0005 |
| 36 | tr. | tr. | 0.0001 | tr. | 0.0005 |
| 37 | tr. | tr. | 0.0001 | tr. | 0.0005 |
| 38 | tr. | tr. | 0.0001 | tr. | 0.0006 |
| 39 | tr. | tr. | 0.0001 | tr. | 0.0006 |
| 40 | tr. | tr. | 0.0001 | tr. | 0.0006 |
| 41 | tr. | tr. | tr. | tr. | 0.0005 |
| 42 | tr. | tr. | tr. | tr. | 0.0006 |
| 43 | tr. | tr. | tr. | tr. | 0.0006 |
| 44 | tr. | tr. | tr. | tr. | 0.0006 |
| 45 | tr. | tr. | tr. | tr. | 0.0006 |
| 46 | tr. | tr. | tr. | tr. | 0.0006 |
| 47 | tr. | tr. | tr. | tr. | 0.0006 |
| 48 | tr. | tr. | tr. | tr. | 0.0006 |
| 49 | tr. | tr. | tr. | tr. | 0.0006 |
| 50 | 0.01 | tr. | tr. | tr. | 0.0006 |

TABLE 1-continued (mass %)

| No. | | | | | |
|---|---|---|---|---|---|
| 51 | 0.05 | tr. | tr. | tr. | 0.0005 |
| 52 | 2.05 | tr. | tr. | tr. | 0.0005 |
| 53 | 6.00 | tr. | tr. | tr. | 0.0006 |
| 54 | tr. | 0.01 | tr. | tr. | 0.0005 |
| 55 | tr. | 0.05 | tr. | tr. | 0.0005 |
| 56 | tr. | 6.00 | tr. | tr. | 0.0005 |
| 57 | 0.05 | 0.05 | tr. | tr. | 0.0005 |
| 58 | 0.05 | tr. | tr. | tr. | 0.0005 |
| 59 | tr. | tr. | 0.0003 | tr. | 0.0005 |
| 60 | tr. | tr. | 0.0011 | tr. | 0.0005 |
| 61 | tr. | tr. | 0.0037 | tr. | 0.0005 |
| 62 | tr. | tr. | 0.0060 | tr. | 0.0005 |
| 63 | tr. | tr. | tr. | 0.0003 | tr. |
| 64 | tr. | tr. | tr. | 0.0013 | tr. |
| 65 | tr. | tr. | tr. | 0.0033 | tr. |
| 66 | tr. | tr. | tr. | 0.0060 | tr. |
| 67 | tr. | tr. | tr. | tr. | 0.0006 |
| 68 | tr. | tr. | tr. | tr. | 0.0015 |
| 69 | tr. | tr. | tr. | tr. | 0.0140 |
| 70 | tr. | tr. | tr. | tr. | 0.0340 |
| 71 | tr. | tr. | tr. | tr. | 0.0600 |
| 72 | tr. | tr. | 0.0011 | 0.0003 | 0.0210 |
| 73 | tr. | tr. | 0.0015 | tr. | 0.0220 |

TABLE 2

| Condition No. | Cooling rate in hot rolling (° C./s) | Coiling temperature (° C.) | Number density of Si-Mn nitrides (per μm³) | $W_{15/50}$ (W/kg) | $B_{50}$ (T) | Remarks |
|---|---|---|---|---|---|---|
| 1 | 50 | 550 | 0.63 | 2.15 | 1.701 | Example |
| 2 | 50 | 550 | 0.10 | 3.05 | 1.730 | Comparative Example |
| 3 | 50 | 550 | 0.30 | 2.25 | 1.710 | Example |
| 4 | 50 | 550 | 0.61 | 2.09 | 1.682 | Example |
| 5 | 50 | 550 | 0.61 | 1.99 | 1.662 | Example |
| 6 | 50 | 550 | 0.63 | 1.88 | 1.663 | Example |
| 7 | 50 | 550 | — | — | — | Comparative Example (cracking in cold rolling) |
| 8 | 50 | 550 | 0.63 | 2.41 | 1.715 | Comparative Example |
| 9 | 50 | 550 | 0.60 | 2.18 | 1.712 | Example |
| 10 | 50 | 550 | 0.60 | 2.12 | 1.690 | Example |
| 11 | 50 | 550 | 0.62 | 2.07 | 1.671 | Example |
| 12 | 50 | 550 | 0.62 | 2.35 | 1.652 | Comparative Example |
| 13 | 20 | 600 | 1.21 | 2.32 | 1.690 | Comparative Example |
| 14 | 35 | 600 | 0.66 | 2.20 | 1.700 | Example |
| 15 | 50 | 600 | 0.62 | 2.18 | 1.705 | Example |
| 16 | 50 | 600 | 0.68 | 2.19 | 1.703 | Example |
| 17 | 50 | 650 | 0.84 | 2.26 | 1.701 | Example |
| 18 | 50 | 700 | 1.25 | 2.30 | 1.697 | Comparative Example |
| 19 | 50 | 550 | 0.62 | 2.14 | 1.700 | Example |
| 20 | 50 | 550 | 0.63 | 2.19 | 1.701 | Example |
| 21 | 50 | 550 | 0.64 | 2.30 | 1.696 | Comparative Example |
| 22 | 50 | 550 | 0.63 | 2.15 | 1.702 | Example |
| 23 | 50 | 550 | 0.64 | 2.16 | 1.701 | Example |
| 24 | 50 | 550 | — | — | — | Comparative Example (cracking in cold rolling) |
| 25 | 50 | 550 | 0.61 | 2.13 | 1.702 | Example |
| 26 | 50 | 550 | 0.63 | 2.21 | 1.702 | Example |
| 27 | 50 | 550 | 0.62 | 2.45 | 1.680 | Comparative Example |
| 28 | 50 | 550 | 0.50 | 2.08 | 1.701 | Example |
| 29 | 50 | 550 | 0.95 | 2.22 | 1.702 | Example |
| 30 | 50 | 550 | 1.12 | 2.41 | 1.685 | Comparative Example |
| 31 | 50 | 550 | 0.64 | 2.16 | 1.701 | Example |
| 32 | 50 | 550 | 0.59 | 2.72 | 1.672 | Comparative Example |
| 33 | 50 | 550 | 0.62 | 2.16 | 1.705 | Example |
| 34 | 50 | 550 | 0.62 | 2.15 | 1.715 | Example |
| 35 | 50 | 550 | 0.61 | 2.16 | 1.723 | Example |
| 36 | 50 | 550 | 0.61 | 2.58 | 1.718 | Comparative Example |
| 37 | 50 | 550 | 0.63 | 2.15 | 1.706 | Example |
| 38 | 50 | 550 | 0.64 | 2.14 | 1.723 | Example |
| 39 | 50 | 550 | 0.62 | 2.41 | 1.710 | Comparative Example |
| 40 | 50 | 550 | 0.61 | 2.16 | 1.723 | Example |
| 41 | 50 | 550 | 0.60 | 2.10 | 1.700 | Example |

TABLE 2-continued

| Condition No. | Cooling rate in hot rolling (° C./s) | Coiling temperature (° C.) | Number density of Si-Mn nitrides (per μm³) | $W_{15/50}$ (W/kg) | $B_{50}$ (T) | Remarks |
|---|---|---|---|---|---|---|
| 42 | 50 | 550 | 0.60 | 2.09 | 1.703 | Example |
| 43 | 50 | 550 | 0.63 | 1.99 | 1.702 | Example |
| 44 | 50 | 550 | 0.61 | 2.55 | 1.697 | Comparative Example |
| 45 | 50 | 550 | 0.62 | 2.08 | 1.701 | Example |
| 46 | 50 | 550 | 0.61 | 2.51 | 1.701 | Comparative Example |
| 47 | 50 | 550 | 0.62 | 2.08 | 1.701 | Example |
| 48 | 50 | 550 | 0.60 | 2.77 | 1.691 | Comparative Example |
| 49 | 50 | 550 | 0.61 | 2.04 | 1.702 | Example |
| 50 | 50 | 550 | 0.62 | 2.12 | 1.701 | Example |
| 51 | 50 | 550 | 0.62 | 2.12 | 1.705 | Example |
| 52 | 50 | 550 | 0.64 | 2.01 | 1.715 | Example |
| 53 | 50 | 550 | 0.63 | 3.10 | 1.681 | Comparative Example |
| 54 | 50 | 550 | 0.63 | 2.12 | 1.701 | Example |
| 55 | 50 | 550 | 0.64 | 2.10 | 1.710 | Example |
| 56 | 50 | 550 | 0.62 | 3.22 | 1.655 | Comparative Example |
| 57 | 50 | 550 | 0.61 | 2.05 | 1.722 | Example |
| 58 | 50 | 550 | 0.58 | 2.12 | 1.701 | Example |
| 59 | 50 | 550 | 0.52 | 2.09 | 1.700 | Example |
| 60 | 50 | 550 | 0.45 | 2.04 | 1.701 | Example |
| 61 | 50 | 550 | 0.38 | 2.03 | 1.702 | Example |
| 62 | 50 | 550 | 0.21 | 2.44 | 1.681 | Comparative Example |
| 63 | 50 | 550 | 0.59 | 2.11 | 1.702 | Example |
| 64 | 50 | 550 | 0.53 | 2.10 | 1.702 | Example |
| 65 | 50 | 550 | 0.39 | 2.06 | 1.701 | Example |
| 66 | 50 | 550 | 0.22 | 2.51 | 1.682 | Comparative Example |
| 67 | 50 | 550 | 0.57 | 2.12 | 1.703 | Example |
| 68 | 50 | 550 | 0.42 | 2.09 | 1.704 | Example |
| 69 | 50 | 550 | 0.34 | 2.04 | 1.703 | Example |
| 70 | 50 | 550 | 0.29 | 2.03 | 1.701 | Example |
| 71 | 50 | 550 | 0.25 | 2.65 | 1.682 | Comparative Example |
| 72 | 50 | 550 | 0.19 | 1.96 | 1.710 | Example |
| 73 | 50 | 550 | 0.21 | 1.98 | 1.708 | Example |

Example 2

The slabs of No. 1 to No. 73 in Table 1 produced in the refining process of converter-vacuum degassing treatment were each treated in the same way as in Example 1 except that the hot-rolled sheet annealing was omitted, to obtain a non-oriented electrical steel sheet. Lastly, using Epstein test pieces of 30 mm×280 mm, the iron loss $W_{15/50}$ was evaluated with a 25 cm Epstein device, and further the number density of Si—Mn nitrides in the final-annealed sheet was measured with a TEM using the same extraction replica method as in Example 1. The results are listed in Table 3.

As can be understood from Table 3, by controlling the chemical composition of the steel material and the coiling treatment conditions within the range according to the present disclosure, a non-oriented electrical steel sheet having excellent iron loss property can be easily obtained.

TABLE 3

| Condition No. | Number density of Si—Mn nitrides (per μm³) | $W_{15/50}$ (W/kg) | $B_{50}$ (T) | Remarks |
|---|---|---|---|---|
| 1 | 0.60 | 2.16 | 1.682 | Example |
| 2 | 0.12 | 3.15 | 1.701 | Comparative Example |
| 3 | 0.29 | 2.29 | 1.681 | Example |
| 4 | 0.64 | 2.18 | 1.661 | Example |
| 5 | 0.63 | 2.07 | 1.631 | Example |
| 6 | 0.63 | 1.95 | 1.633 | Example |
| 7 | — | — | — | Comparative Example (cracking in cold rolling) |
| 8 | 0.62 | 2.41 | 1.685 | Comparative Example |
| 9 | 0.62 | 2.29 | 1.693 | Example |
| 10 | 0.63 | 2.21 | 1.660 | Example |
| 11 | 0.64 | 2.17 | 1.652 | Example |
| 12 | 0.65 | 2.44 | 1.632 | Comparative Example |
| 13 | 1.25 | 2.41 | 1.671 | Comparative Example |
| 14 | 0.68 | 2.28 | 1.675 | Example |
| 15 | 0.65 | 2.25 | 1.674 | Example |
| 16 | 0.68 | 2.22 | 1.678 | Example |
| 17 | 0.93 | 2.29 | 1.675 | Example |
| 18 | 1.42 | 2.41 | 1.672 | Comparative Example |
| 19 | 0.64 | 2.21 | 1.681 | Example |
| 20 | 0.63 | 2.26 | 1.680 | Example |
| 21 | 0.65 | 2.40 | 1.672 | Comparative Example |
| 22 | 0.61 | 2.25 | 1.682 | Example |
| 23 | 0.63 | 2.26 | 1.681 | Example |
| 24 | — | — | — | Comparative Example (cracking in cold rolling) |
| 25 | 0.62 | 2.21 | 1.683 | Example |
| 26 | 0.60 | 2.28 | 1.681 | Example |
| 27 | 0.63 | 2.55 | 1.662 | Comparative Example |
| 28 | 0.51 | 2.12 | 1.682 | Example |
| 29 | 0.96 | 2.29 | 1.681 | Example |
| 30 | 1.16 | 2.51 | 1.662 | Comparative Example |
| 31 | 0.62 | 2.26 | 1.682 | Example |
| 32 | 0.60 | 2.81 | 1.652 | Comparative Example |
| 33 | 0.60 | 2.21 | 1.687 | Example |
| 34 | 0.60 | 2.22 | 1.687 | Example |
| 35 | 0.61 | 2.21 | 1.702 | Example |
| 36 | 0.63 | 2.69 | 1.705 | Comparative Example |

TABLE 3-continued

| Condition No. | Number density of Si—Mn nitrides (per μm³) | $W_{15/50}$ (W/kg) | $B_{50}$ (T) | Remarks |
|---|---|---|---|---|
| 37 | 0.62 | 2.25 | 1.701 | Example |
| 38 | 0.62 | 2.24 | 1.701 | Example |
| 39 | 0.64 | 2.51 | 1.692 | Comparative Example |
| 40 | 0.60 | 2.26 | 1.703 | Example |
| 41 | 0.63 | 2.20 | 1.680 | Example |
| 42 | 0.63 | 2.20 | 1.682 | Example |
| 43 | 0.64 | 2.08 | 1.681 | Example |
| 44 | 0.64 | 2.66 | 1.679 | Comparative Example |
| 45 | 0.64 | 2.15 | 1.682 | Example |
| 46 | 0.64 | 2.61 | 1.683 | Comparative Example |
| 47 | 0.63 | 2.15 | 1.682 | Example |
| 48 | 0.62 | 2.81 | 1.671 | Comparative Example |
| 49 | 0.60 | 2.11 | 1.680 | Example |
| 50 | 0.64 | 2.19 | 1.681 | Example |
| 51 | 0.64 | 2.18 | 1.683 | Example |
| 52 | 0.62 | 2.11 | 1.695 | Example |
| 53 | 0.63 | 3.10 | 1.661 | Comparative Example |
| 54 | 0.63 | 2.19 | 1.681 | Example |
| 55 | 0.63 | 2.18 | 1.700 | Example |
| 56 | 0.63 | 3.33 | 1.645 | Comparative Example |
| 57 | 0.61 | 2.09 | 1.697 | Example |
| 58 | 0.62 | 2.21 | 1.686 | Example |
| 59 | 0.58 | 2.17 | 1.688 | Example |
| 60 | 0.52 | 2.11 | 1.684 | Example |
| 61 | 0.47 | 2.12 | 1.685 | Example |
| 62 | 0.35 | 2.49 | 1.661 | Comparative Example |
| 63 | 0.57 | 2.20 | 1.680 | Example |
| 64 | 0.52 | 2.19 | 1.686 | Example |
| 65 | 0.43 | 2.11 | 1.679 | Example |
| 66 | 0.33 | 2.61 | 1.663 | Comparative Example |
| 67 | 0.58 | 2.21 | 1.649 | Example |
| 68 | 0.58 | 2.17 | 1.685 | Example |
| 69 | 0.44 | 2.12 | 1.688 | Example |
| 70 | 0.31 | 2.11 | 1.682 | Example |
| 71 | 0.29 | 2.71 | 1.663 | Comparative Example |
| 72 | 0.21 | 2.05 | 1.687 | Example |
| 73 | 0.23 | 2.07 | 1.694 | Example |

The invention claimed is:

1. A method of producing a non-oriented electrical steel sheet, the method comprising:
   hot rolling a slab having a chemical composition consisting of, in mass %,
   C: 0.0050% or less,
   Si: 2.0% or more and 6.0% or less,
   Mn: 1.0% or more and 3.0% or less,
   P: 0.20% or less,
   S: 0.0050% or less,
   N: 0.0050% or less,
   Al: 0.0050% or less, and
   one or more selected from the group consisting of B: 0.0001% or more and 0.0050% or less, Nb: 0.0001% or more and 0.0050% or less, and V: 0.0005% or more and 0.0500% or less, with a balance consisting of Fe and inevitable impurities to obtain a hot-rolled sheet;
   coiling the hot-rolled sheet;
   subjecting the hot-rolled sheet to hot-rolled sheet annealing;
   thereafter cold rolling the hot-rolled sheet once or twice with intermediate annealing being performed therebetween, to obtain a cold-rolled sheet; and
   subjecting the cold-rolled sheet to final annealing,
   wherein the hot-rolled sheet after the hot rolling is cooled at an average cooling rate from 800° C. to 650° C. of 30° C./s or more, and thereafter the coiling is performed at 650° C. or less, and
   the hot-rolled sheet after the hot-rolled sheet annealing is cooled at an average cooling rate from 800° C. to 650° C. of 30° C./s or more.

2. The method of producing a non-oriented electrical steel sheet according to claim 1, wherein the chemical composition further contains, in mass %, one or two selected from the group consisting of Sn: 0.01% or more and 0.50% or less and Sb: 0.01% or more and 0.50% or less.

3. The method of producing a non-oriented electrical steel sheet according to claim 1, wherein the chemical composition further contains, in mass %, one or more selected from the group consisting of Ca: 0.0001% or more and 0.0300% or less, Mg: 0.0001% or more and 0.0300% or less, and REM: 0.0001% or more and 0.0300% or less.

4. The method of producing a non-oriented electrical steel sheet according to claim 1, wherein the chemical composition further contains, in mass %, one or two selected from the group consisting of Ni: 0.01% or more and 5.00% or less and Co: 0.01% or more and 5.00% or less.

* * * * *